United States Patent [19]

Trotel

[11] 3,934,187

[45] Jan. 20, 1976

[54] DEVICE FOR THE ACCURATE POSITIONING OF AN OBJECT HOLDER IN RELATION TO THE ELEMENTS OF A PARTICLE-TYPE OPTICAL SYSTEM, AND A PARTICLE-TYPE OPTICAL SYSTEM EQUIPPED WITH SAID DEVICE

[75] Inventor: Jacques Trotel, Paris, France

[73] Assignee: Thomson-CSF, Paris, France

[22] Filed: Feb. 27, 1974

[21] Appl. No.: 446,504

[30] Foreign Application Priority Data

Mar. 2, 1973 France .............................. 73.07540

[52] U.S. Cl. ................ 318/640; 318/603; 318/632; 318/685

[51] Int. Cl.² ........................................... G05B 1/06

[58] Field of Search ........... 318/577, 640, 603, 632, 318/685

[56] References Cited
UNITED STATES PATENTS

| | | | |
|---|---|---|---|
| 3,502,880 | 3/1970 | Martinek et al. ................ | 318/557 X |
| 3,566,239 | 2/1971 | Taniguchi ........................ | 318/640 X |
| 3,742,326 | 6/1973 | Okuda .............................. | 318/603 |
| 3,786,332 | 1/1974 | Hepner et al. ..................... | 318/577 |
| 3,805,138 | 1/1973 | Hilker .............................. | 318/696 |

*Primary Examiner*—B. Dobeck
*Attorney, Agent, or Firm*—Cushman, Darby & Cushman

[57] ABSTRACT

A device for the accurate positioning of an object holder in relation to the elements of a particle-type optical system, for example an electron-optical system, comprises for each direction of displacement a comparator which compares the position required by a computer, with the number recorded by a counter counting the fringes in an interferometer. The comparator is connected to a three-output logic circuit which can adopt each of two logic levels. The states of the outputs represent the direction of displacement to be produced, and its amplitude. A stepping motor receives the pulses from a clock which adopts two preset frequencies that are controlled by said three outputs.

6 Claims, 3 Drawing Figures

DEVICE FOR THE ACCURATE POSITIONING OF AN OBJECT HOLDER IN RELATION TO THE ELEMENTS OF A PARTICLE-TYPE OPTICAL SYSTEM, AND A PARTICLE-TYPE OPTICAL SYSTEM EQUIPPED WITH SAID DEVICE

The present invention relates to devices, for example electronic optical devices, designed to produce a particle beam the particles of which are intended to bombard a specific point on a sample.

A device of this kind may be utilised to record information upon a substrate constituted by a plate coated with a layer of electron-sensitive resin, in particular to manufacture masks intended for use in semiconductor work, or also to read out information carried upon a substrate or carrier on which there are discrete zones which, under the effect of electron bombardment, may either emit secondary electrons, or back scatter electrons or x or light rays.

In devices of this kind, the problem arises of bombarding a specific reference point on the sample, the coordinates of this point in relation to fixed axes associated with said sample, being defined with high accuracy. For this point, the scanning of the sample may take place by programming using an electronic computer acting through the medium of digital-analogue converters, upon the beam deflection system.

Devices of this kind are known, but hitherto they have not made it possible to achieve a relative accuracy in excess of $10^{-4}$ and an absolute accuracy of more than a few microns, something which is often insufficient.

The device proposed in accordance with the invention for the precision positioning of a sample-holder in relation to the elements of a particle optical system producing a particle beam, makes it possible to achieve absolute accuracy of at least 400 Angstroms units and to permanently correct the effects of any vibration which is present.

The device in accordance with the invention is of the kind utilising interferometers and fringe counters in order to measure the displacements of the sample holder in two mutually perpendicular directions.

It comprises for each displacement, a digital comparator whose inputs are connected on the one hand to the outputs of a register displaying the position required by the computer, and to the outputs of a counter which counts the interference fringes in the interferometer, and an output controlling a decoder with at least three outputs of its own, each acquiring a logic 0 or 1 state, the state of the first of the these outputs translating the direction of the displacement to be produced, the state of the second controlling the speed of the motor which displaces the sample holder, and giving it a first speed $V_1$ when the displacement to be produced is greater than a given amplitude, and a second speed $V_o < V_1$ when the amplitude of the displacement to be produced is between said first amplitude and a second amplitude lower than the first.

The invention will be better understood from a consideration of the following description and by reference to the attached drawings in which.

Figure 1:
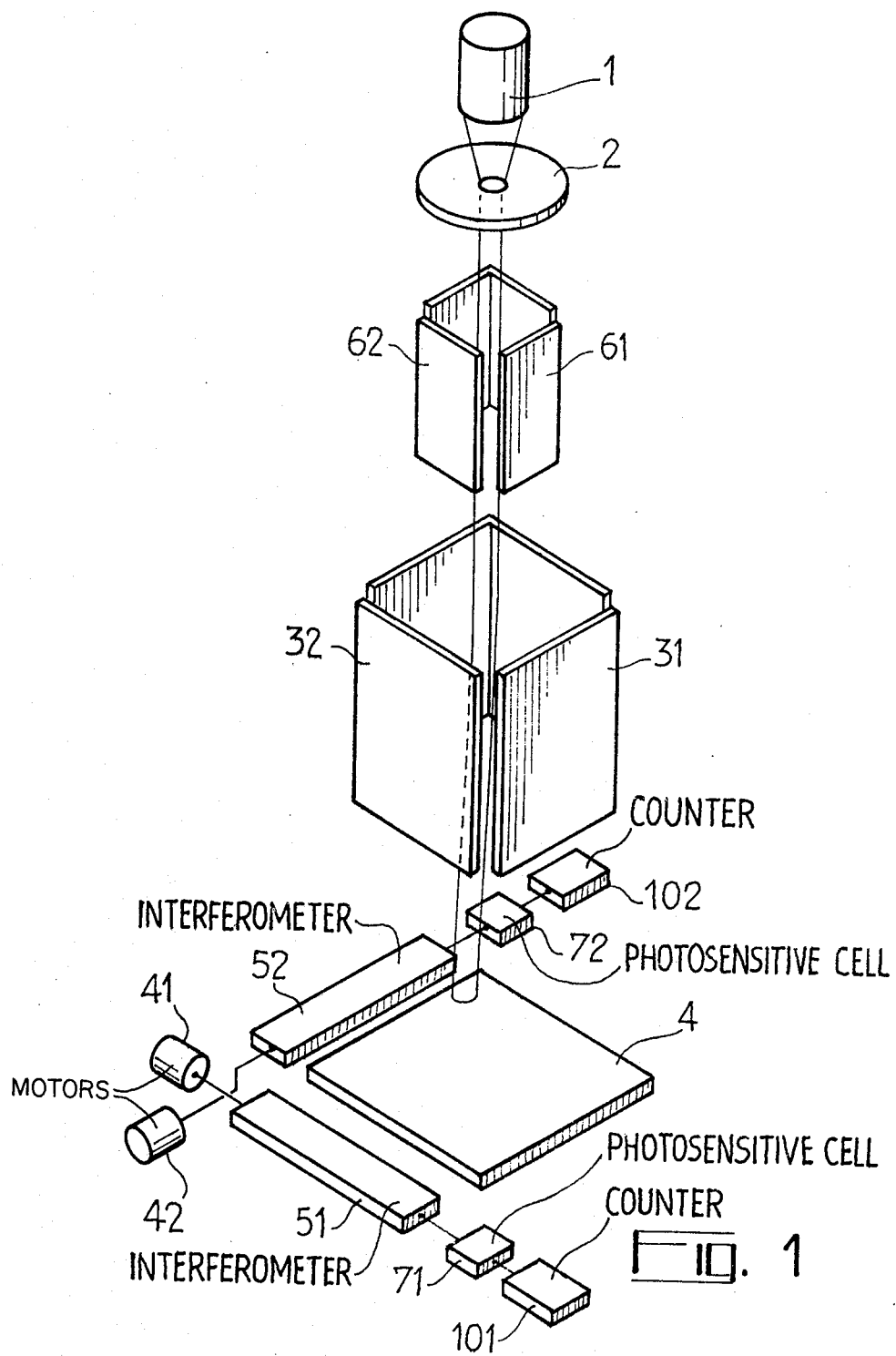
FIG. 1 illustrates an electron-optical apparatus with which the device in accordance with the invention is associated.

In FIG. 1, there is a highly schematic illustration of an electron-optical device of the so-called geographic addressing type. A device of this kind comprises a cathode 1, and an accelerator anode 2, in which a hole is provided to pass the electron beam emitted by the cathode, this anod giving the electrons a speed which is determined by the potential difference between cathode and anode.

Two systems of deflection plates of a type well known per se, are arranged in order to surround the beam. Two of these plates which are perpendicular to one another, are connected to one another and earthed, the two others 31 and 32 receive voltages supplied by a computer and numerical-digital converters not shown in the figure. They thus make it possible to effect programmed deflection of the beam in accordance with the two directions X and Y. The beam bombards an object (not shown), positioned on an object holder 4 in a highly accurate fashion by means of wedges, for example, or by some other well known device.

Stepping motors 41 and 42 control the displacement of the object holder in the two directions X and Y respectively.

Said object holder is associated with two interferometers 51 and 52. Connected to each of these interferometers, there is a counter 101, or 102 as the case may be. When the object holder displaces, interference fringes displace accordingly. A photosensitive cell 71 or 72, emits a pulse with each fringe passage (white for example). The signals are counted by the two counters; the numbers which they display translate the X and Y coordinates.

For given voltages aaplied to the deflecting plates, the problem arises of bombarding an accurate point on the object being printed, indeed with an absolute accuracy of less than 500 Angstroms units. This precise point will for example be the start of a line programmed by the computer. To bombard this point, the object holder must have a perfectly defined position in relation to the X and Y axes. An auxiliary system of deflecting plates 61, 62 arranged upstream as it were on the main plates and connected to the device in accordance with the invention, makes it possible, by displacing the beam, either to reduce the residual error or to eliminate the effects of vibrations.

Figure 2:
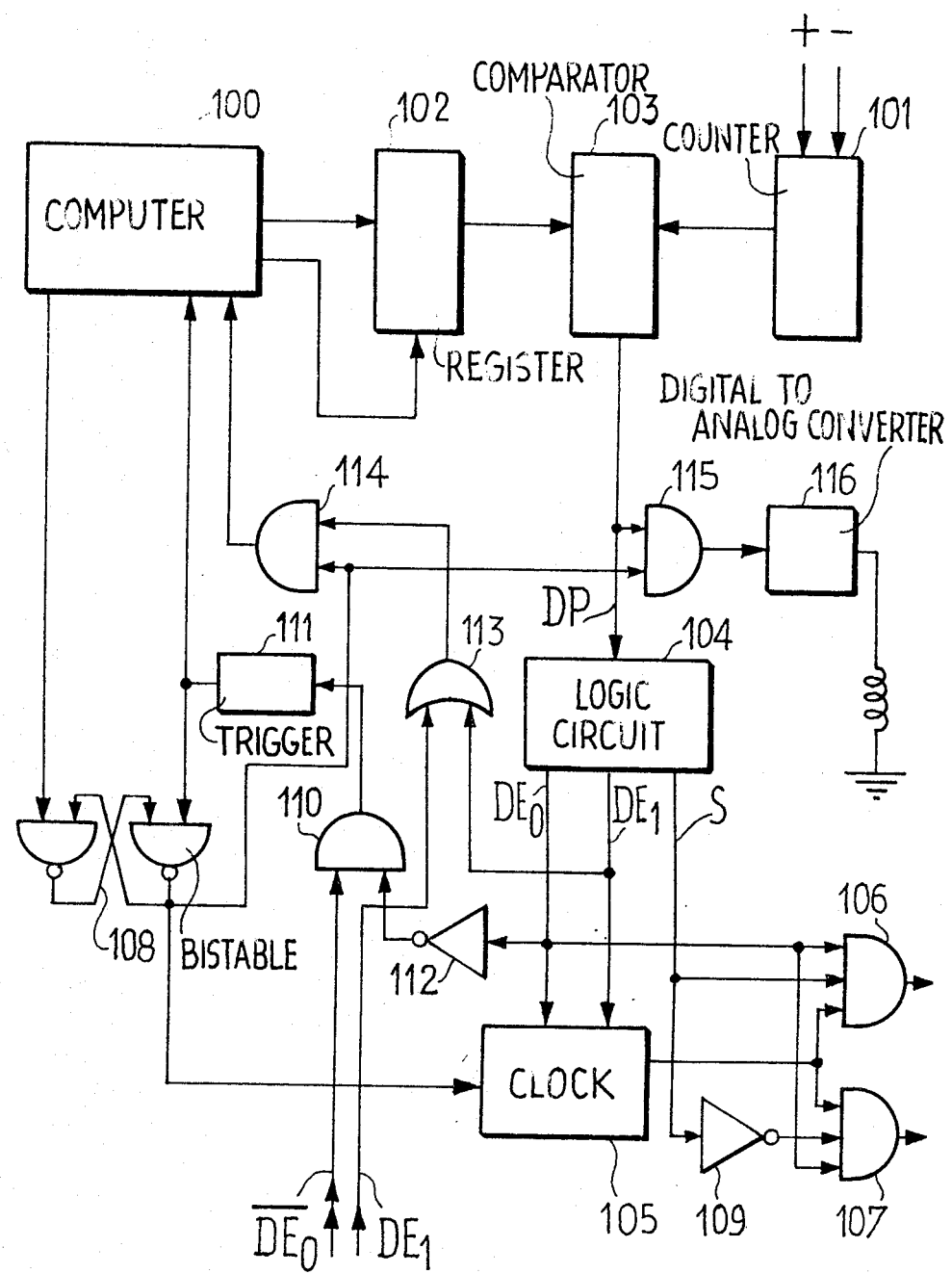
FIG. 2 is a block diagram of one of the two identical parts of the device in accordance with the invention.

The device in accordance with the invention comprises two identical parts acting respectively upon the correction channels X or Y. Only that part of the device corresponding to the X channel has actually been shown in FIG. 2. An identical device acts on channel Y.

This device comprises, associated with the computer 100 programming the scanning of the beam, the counter 101 which records the instantaneous coordinate position X.

The output of the counter 101 and the output of a register 102 which records the X value required by the computer, are connected to the two inputs of a comparator or substractor 103. The latter forms the difference E between the coordinate $X_o$ called up by the computer, and the coordinate $X_1$ displayed by the counter.

The output of this substractor is connected to the input of a decoder circuit 104 which supplies at three outputs the three two-level logic signals, namely $DE_o$, $DE_1$ and S. $E_o$ is the minimum error value which can be corrected by a mechanical displacement.

$E_1$ is the maximum value of the error which can be corrected by the deflection of the electron beam, so that we have $|E_1| > |E_o|$.

The voltage $DE_o$ will for example have the value 1 when $|E| > |E_o|$ the value 0 when $|E| > |E_o|$ The voltage $DE_1$ will for example have the value 1 when $|E| > |E_1|$ and will have the value 0 when $|E| < |E_1|$ and we therefore have:

$S = 1$ for $E > 0$
$S = 0$ for $E < 0$.

The output $DE_o$ and the output $DE_1$ are connected to two inputs of a clock 105 capable of emitting pulses whose frequency ranges between two values $F_B$ and $F_H$. $F_B$ is the maximum frequency of the pulses for which the stepping motor controlling the displacements of the object holder will start, in view of its load. $F_H$ is the maximum frequency of the pulses for which the motor acquires its maximum speed.

The computer produces a positioning command by acting through one of its outputs to place a bistable trigger stage 108 in the 0 state; this trigger stage is reset to the 1 state by a signal indicating the end of the mechanical positioning, and its output voltage is connected to an input of the computer.

When the positioning command has been given, the computer indicates the desired position, the comparator furnishing at its output a number DP. The clock frequency if $DE_1$ is initially equal to 1, changes progressively from $F_B$ to $F_H$, in accordance with a law depending upon the motor characteristics.

The clock output is connected to the motor through the medium of two circuits 106 and 107. The circuits 106 and 107 are respectively connected to two inputs of the motor (not shown), which control its rotation in either one direction or the other. The output S is connected respectively directly to another input of the AND-gate 106 and to the AND-gate 107 through the medium of a logic inverter 109 which produces at its output the complement $\overline{S}$ of S. Moreover, the output $DE_o$ is connected to a third input of the circuit 106 and 107.

The output $\overline{DE_o}$, is connected on the other hand to an input of an And-gate 110 through the medium of a logic inverter 112, the output of said AND-gate being connected to a monostable trigger circuit 111 which produces a so-called correct position pulse and supplies it to a first input of the computer and to the bistable trigger stage 108, which changes to the 1 state.

The other input of the circuit 110 is connected in the same fashion to the output $DE_o$ of the part not shown of the device associated with the other channel, i.e. the channel Y.

In other words, said AND-gate 110 produces an output voltage when the two valves $DE_o$ are equal to 0 or when their complements $\overline{DE_o}$ are equal to 1.

The output $DE_1$ is connected to an input of the OR-gate 113. The circuit 113 is supplied at its other input with the $DE_1$ output of the other channel. Its output is connected to a first input of an AND-gate 114. The output of the bistable trigger stage 108 is connected on the one hand to the second input of the AND-gate 114, whose output is connected to a second input of the computer, and on the other hand to an AND-gate 115 whose other input is connected directly to the output DP.

The output of the AND-gate 115 is connected to a digital-analogue converter 116 whose voltage is applied to the corresponding deflecting plate or coil 61 or 62.

Figure 3:
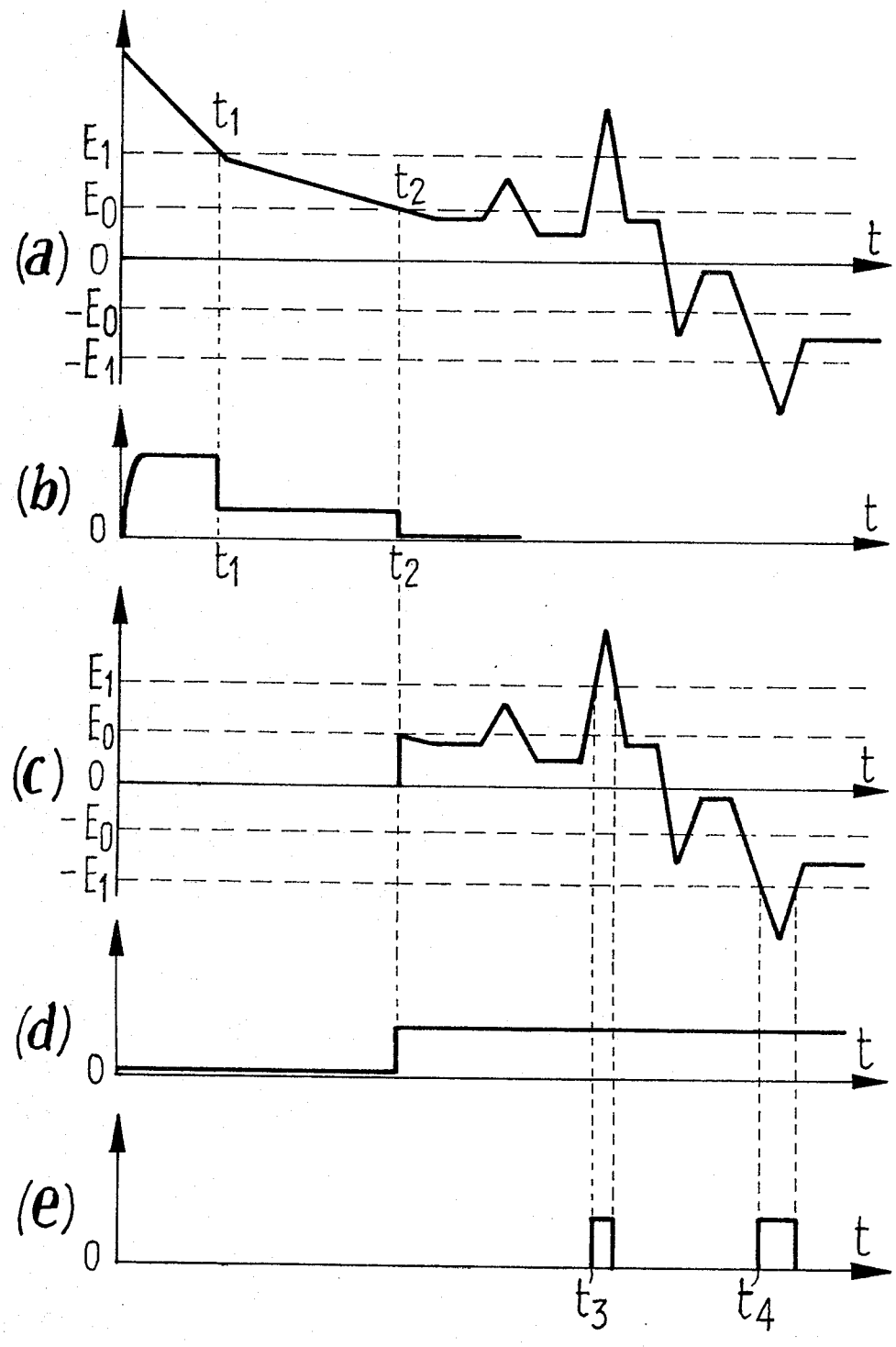
FIG. 3 is a set of explanatory graphs illustrating the operation of the device shown in FIG. 2.

The operation of the system will be better understood from a consideration of the graphs shown in FIG. 3. In each graph, the abscissae represent the time $t$. The graph $a$ illustrates the positioning error in the channel in question.

The graph $b$ illustrates the speed of the associated motor.

The graph $c$ illustrates the deviations of the beam, required in order to correct the effects of vibrations.

The graph $d$ illustrates the correct position signal.

The graph $e$ illustrates the incorrect position signal which is produced when the object holder is submitted to vibrations.

As a matter of fact, positioning occupies two phases, one which we will call mechanical positioning, in which it is solely the motor which is involved, and the other the correction of vibrations, in which accidental displacements are corrected solely by acting upon the electron beam.

In the first phase, which starts at the time $t_o$, the correcting command is given by the computer and places the bistable trigger stage 108 in the zero state. The required position is recorded by the register 102. The error is displayed by the comparator 103. The gate 114 is closed, the trigger stage being in the 0 state.

We will commence from the hypothesis that DP is greater than $E_1$.

$DE_1$ goes into the 1 state. S adopts the state corresponding to the direction of the displacement which is to be produced. The clock shifts progressively from the frequency $F_B$ to the frequency $F_H$. One of the gates 106 and 107 is open depending upon the sign of S. Moreover, $DE_o = 1$ since $|E_1|$ is greater than $|E_o|$. The motor therefore rotates at maximum speed as the graph $(b)$ shows.

At the time $t_1$, E becomes smaller than $E_1$ but remains greater than $E_o$. $DE_o$ remains equal to 1 but $DE_1$ changes to 0.

The clock produces the frequency $F_B$ and the motor rotates at its lowest speed (graph $b$).

At the time $t_2$, E is equal to $E_o$, the motor stops and the inverter 112 supplies to the AND-gate 110 the voltage 1. If the same result is acheived in the other channel, the AND-gate 110 produces a signal 1, and the bistable trigger stage 111 supplies a correct position signal (graph $d$) which is applied on the one hand to the computer and on the other to the bistable trigger stage 108 which changes to the 1 state and stays there.

If, as a consequence of vibrations, $DE_1$ changes to the 1 state, one of the inputs of the circuit 113 is excited.

Circuit 114 is supplied on the one hand with the voltage of level 1 from this circuit, and on the other with the voltage 1 coming from the trigger stage 108. The gate is opened and supplies the computer with an incorrect position signal (time $t_3$ and time $t_4$, graph (e)).

The gate 115 is also open with the result (graph $c$) that the beam $b$ experiences correcting deflections via the output DP.

It will be seen that the described apparatus makes it possible to effect accurate positioning and automatic correction of the effects caused by vibration.

What I claim is:

1. A system for the accurate positioning of a sample holder, in relation to the elements of a corpuscular optical system producing a particle beam, this system comprising two interferometers and two interference fringe counters, having respective outputs for measuring respectively the displacements of said sample holder in two mutually perpendicular directions, said system comprising in combination, for each of said directions: a digital comparator having two inputs and one output, a register recording the position required by a computer, said two inputs of said comparator being respectively connected to said counter output and said register output,; a logic circuit having an input connected to said comparator output, and three two state outputs, each of said two state outputs delivering respectively two logic voltage levels corresponding respectively to states "0" and "1", the state of said first input being significant of the sign of the correction to be made, a motor, a motor controlling speed device, for giving two said motor one of said direction and first and second predetermined speeds and for stopping said motor, said controlling device having a first and a second control input respectively connected to said second and said third output of said logic circuits and giving to said motor said first speed when both said outputs of said logic circuit are in the state 1, said second speed when only said third input is in state "1" and stopping said motor when both said outputs are in the "0" state, said respective states of said outputs being significant of the amplitude of the correction to be effected; said first output of said controlling device controlling the rotation direction of said motor.

2. A system as claimed in claim 1, further comprising a logical circuit actuating a digital to analog converter, for correcting the effects of random displacements of said sample holder.

3. A system as claimed in claim 1, wherein said system includes a clock having an output delivering pulses at two predetermined recurrent frequencies, said motor being of the step by step type, means being provided for controlling the rotation speed of the motor as a function of said pulses frequency.

4. A system according to claim 3, wherein speed rotation controlling means comprise a first and a second AND-gate, having each one output, connected to said motor, each of said outputs when actuated giving respectively to said motor one direction of rotation and the opposite one, and a first, second and third inputs, said first inputs being connected to said clock output, the second inputs of said first gate and of said second gates being respectively directly and by means of an inverter connected to said logic circuit first outputs, said third inputs being directly connected to said logic circuit first output.

5. A system as claimed in claim 4, wherein means are provided for controlling the start of said clock by said computer.

6. A system as claimed in claim 5, wherein said means comprises a bistable toggle emitting a pulse when actuated by said computer.

* * * * *